June 5, 1923.

L. E. SMITH

CIDER MILL

Filed Jan. 11, 1922

Inventor
Luther Edwin Smith,
By Louis M. Schmidt,
Atty.

June 5, 1923.

L. E. SMITH

CIDER MILL

Filed Jan. 11, 1922

Inventor
Luther Edwin Smith,
By Louis M. Schmidt
Atty.

Patented June 5, 1923.

1,457,755

UNITED STATES PATENT OFFICE.

LUTHER EDWIN SMITH, OF SHELBURNE FALLS, MASSACHUSETTS, ASSIGNOR OF ONE-THIRD TO CLIFTON E. DAVENPORT AND ONE-THIRD TO JOHN C. HOFFMAN, BOTH OF NEW BRITAIN, CONNECTICUT.

CIDER MILL.

Application filed January 11, 1922. Serial No. 528,380.

*To all whom it may concern:*

Be it known that I, LUTHER EDWIN SMITH, a citizen of the United States, residing at Shelburne Falls, in the county of Franklin and State of Massachusetts, have invented certain new and useful Improvements in Cider Mills, of which the following is a specification.

My invention relates to improvements in cider mills, and the object of my improvement is to produce a power driven cider mill that is continuous in operation, involving the use of a combination of pressure rolls and endless belts, wherein the ground apples are delivered to said belts and rolls to be operated upon, the cider being forced out by reason of pressure due to the rolls and collected in a suitable trough, and the pomace is delivered away from said rolls by means of said belts and deposited outwardly beyond the trough and away from the operating mechanism, the cider being drawn off from the trough in any convenient manner for being filtered in the usual manner.

In the accompanying drawing:—

Figure 1:
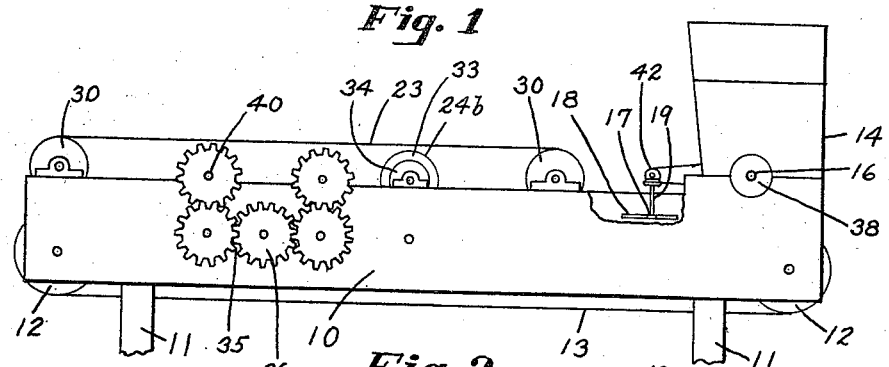
Figure 1 is a diagrammatic representation in side elevation of a cider mill embodying my invention.
Figure 2:
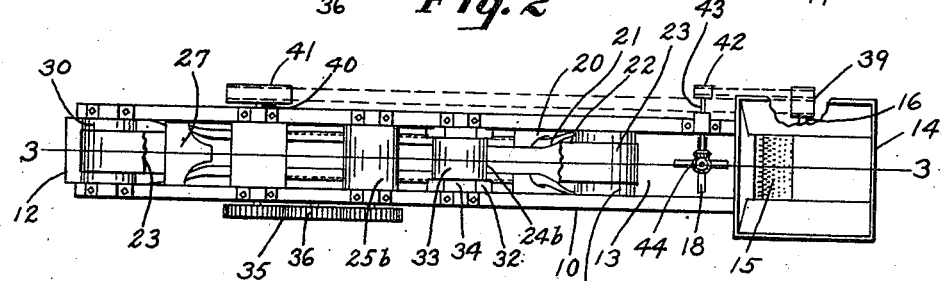
Figure 2 is a plan view of the same.
Figure 3:
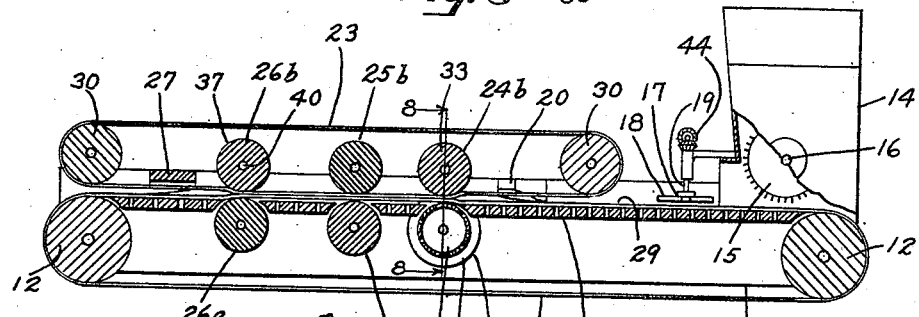
Figure 3 is a longitudinal sectional view of the same on the line 3—3 of Fig. 2.
Figure 4:
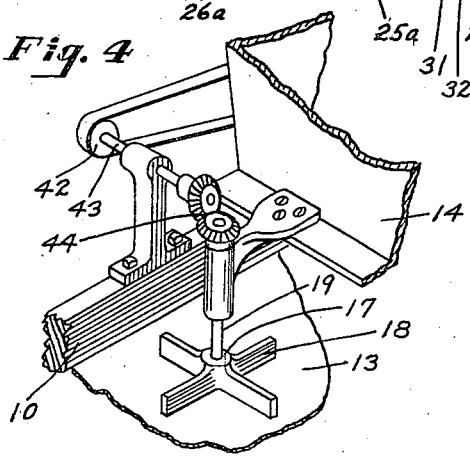
Figure 4 is a perspective view on an enlarged scale of the spreader and adjacent parts.
Figure 5:
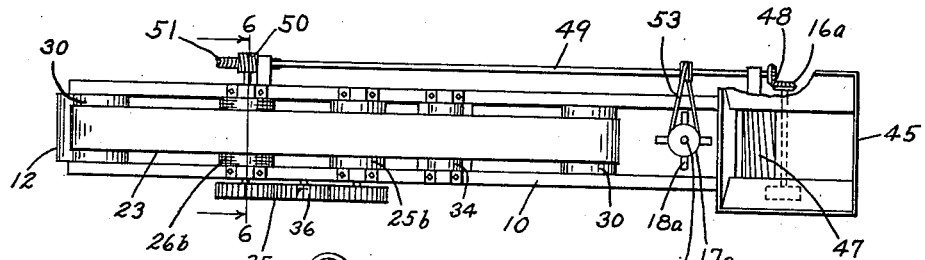
Figure 5 is a plan view of a structure adapted to operate upon apples previously ground and involving the use of a feeding device in lieu of the grinder as used in the form shown in Figs. 1, 2, and 3, and on the scale of said figures.
Figure 6:
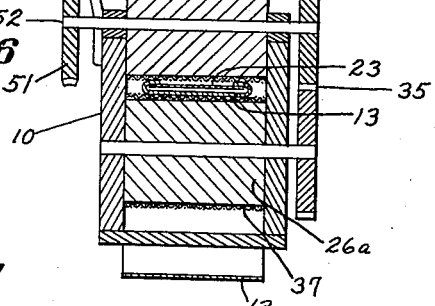
Figure 6 is a sectional view of part of the driving mechanism on the line 6—6 of Fig. 5, on an enlarged scale.
Figure 7:
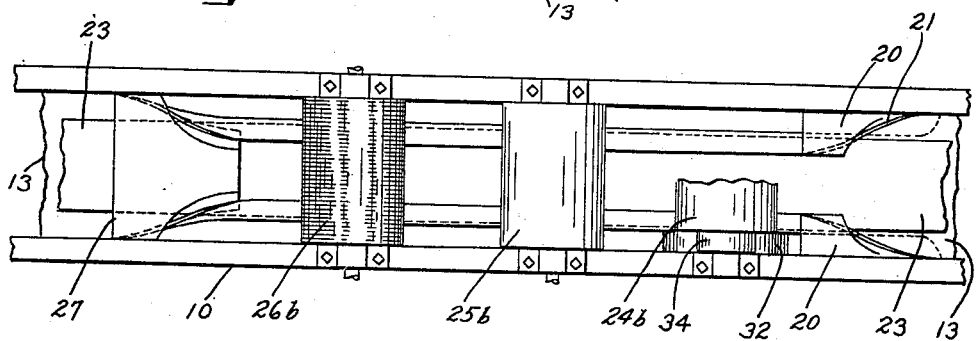
Figure 7 is a fragmentary plan view of the middle part of the structure, showing the rolls, and also parts of the folding or mold boards.
Figure 8:
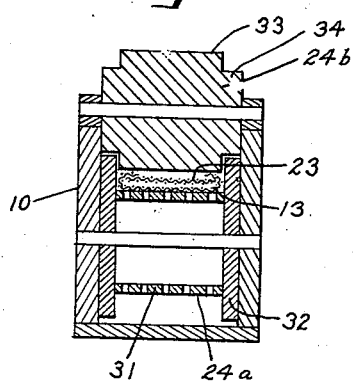
Figure 8 is a sectional view on the line 8—8 of Fig. 3.

My improved cider mill comprises an elongated trough 10 which may be supported on a pair of horses 11 and which has a pair of guide pulleys 12 operatively mounted one at each end, an endless belt 13 of suitable porous fabric, such as burlap, being operatively supported by said guide pulleys 12.

At the inner or supply end of said trough 10 may be positioned a grinding device 14 having a grinding wheel 15 mounted on the shaft 16 that is adapted to deliver the ground apples to the belt 13.

Positioned in front of the grinding device 14 and opposed to and above the belt 13 is a spreader 17 in the form of a star-wheel made of crossed arms 18 for spreading the material evenly over the surface of the belt 13, being operatively supported for rotation by means of a vertical shaft 19.

Outward from the spreader 17 is a pair of folding mold boards 20, one on each side of the belt 13, for turning the edge portions 21 thereof inwardly over the adjacent edge portions 22 of the upper belt 23.

Outward from the mold boards 20 is a set of rolls, arranged in pairs and one above the other, the lower roll of each pair being housed within the upper and lower reaches of the lower belt 13 and the upper roll being similarly housed between the reaches of the upper belt 23.

The first pair of rolls consists of the lower roll $24^a$ and the upper roll $24^b$.

The second pair consists of the lower roll $25^a$ and the upper roll $25^b$.

The third pair of rolls consists of the lower roll $26^a$ and the upper roll $26^b$.

The different rolls differ in details, as will be described.

Outward from the rolls is the unfolding mold board 27 that serves to open out the edges of the lower belt 13 so that it passes to the outer guide roll 12 in the fully open condition.

Perforated boards 28 may be provided under the major portion of the upper reach 29 of the lower belt 13 on each side of the rolls so as to serve as a general support therefor and prevent sagging.

The upper belt 23 is supported by guide rolls 30 at the ends. The material used for said upper belt is an impervious fabric, such as canvas.

The rolls $24^a$ and $24^b$, constituting the first pair, run freely and are rotated merely by contact with the belts. The lower roll $24^a$ has a cylindrical body 31 that is perforated and is bordered at each end by a disc that is of larger diameter than said body 31 so as to provide a radially directed flange 32 at each end, the said flange 32 and the periphery of the body 31 combining to provide a channel for admitting the composite structure composed of the two belts 13 and 23, with the edges of the former folded over the latter as described, and a layer of the material to be operated upon between the body portions of the belts.

The upper roll 24$^b$ of the first pair has a plain body 33 and is provided with end discs 34 that are smaller than the roll body 33 in diameter to provide clearance for the flanges 32 and permit the roll body 33 to enter the channel between said flanges 32.

The second and third pairs of rolls are all power driven, the character 35 designating generally a set of gear wheels for effecting the proper rotation thereof, and which comprises a suitable idler gear 36 for maintaining the proper direction of revolution of the gears comprising said set.

The rolls 25$^a$ and 25$^b$ of the second set are plain wooden rolls.

The rolls 26$^a$ and 26$^b$ constituting the third set have plain bodies but have the peripheries covered with a suitable fabric 37, such as burlap.

Any suitable means may be provided for permitting of adjusting the rolls and changing the separating space between the opposed faces and for resiliently applying pressure to the upper roll of each pair.

The shaft 16 for the grinder 14 may be used as the driving shaft, the power belt being applied to the pulley 38 on one end thereof.

The pulley 39 for the transmission belt may be at the other end of said shaft 16 and the shaft 40 for the upper roll 26$^b$ may have the pulley 41 for being driven by said belt.

A pulley 42 for receiving a small driving belt may be used for rotating the spreader 17 through the medium of the horizontal shaft 43 on which said pulley 42 is mounted and a pair of bevel gears 44 for operatively connecting said horizontal shaft 43 and the vertical shaft 19 that supports the starwheel or spreader proper 18.

In case a feeder 45 is used in lieu of the grinder 14 the details for driving may be changed considerably.

One arrangement for this is as follows:—
The shaft 16$^a$ for the feeder roll 47 drives by means of a pair of bevel gears 48 at the end thereof a worm shaft 49 having the worm 50. The worm gear 51 driven by said worm 50 is mounted on the shaft 52 on which is also mounted the upper third roll 26$^b$.

The spreader 17$^a$ having the spider arms 18$^a$ is mounted on the vertical shaft 19$^a$ and is driven from the worm shaft 49 by means of a belt 53 and suitable pulleys.

The representations of the grinder 14 and the feeder 45 are merely conventional and the choice as to which of these devices is used depends upon the practice that is to be followed in producing the cider. Both feed ground apples to the belt.

I claim as my invention:—

In a cider mill having an elongated trough and endless belt structures and a set of rolls associated with said trough, said belt structures comprising the combination of a wide lower belt and an upper belt that covers the middle and major portion of said lower belt in the active cooperating position, means on the receiving side of said rolls for turning the edges of said lower belt over the edges of said upper belt and means on the delivery side of said rolls for opening out said turned edges.

LUTHER EDWIN SMITH.